United States Patent
Maggi et al.

[11] 3,979,376
[45] Sept. 7, 1976

[54] 4-GUANYLAZO-4-DEOXYRIFAMYCIN SV DERIVATIVES

[75] Inventors: Nicola Maggi, Cusano (Milan); Piero Sensi, Milan, both of Italy

[73] Assignee: Gruppo Lepetit S.p.A., Milan, Italy

[22] Filed: Feb. 18, 1971

[21] Appl. No.: 116,601

[30] Foreign Application Priority Data
Feb. 23, 1970   Italy.................................. 20973/70

[52] U.S. Cl. ............................ 260/152; 260/239 R; 260/999; 424/226
[51] Int. Cl.² ................. A61K 31/655; A61L 13/00; C07C 107/04
[58] Field of Search ............ 260/152, 564 R, 564 A, 260/566 R, 239 R; 424/244

[56] References Cited
UNITED STATES PATENTS
2,513,996   7/1950   Haury ............................ 260/566 R OTHER PUBLICATIONS
Greco et al., Chemical Abstracts, vol. 57, pp. 12474–12475 (1962).
Sensi et al., Antibiot. Chemotherapy, vol. 12, pp. 488–494 (1962).
Theilheimer, "Synthetic Methods of Organic Chemistry", p. 250 (1960).
Maggi et al., Chemical Abstracts, vol. 70, p. 347, 57609e (1969).
Ciba Ltd., Chemical Abstracts, vol. 71, pp. 406 to 407, 500 14u (1969).

*Primary Examiner*—Floyd D. Higel
*Attorney, Agent, or Firm*—Theodore Post; C. Kenneth Bjork

[57] ABSTRACT

Antimicrobial substances of the rifamycin family corresponding to the formula

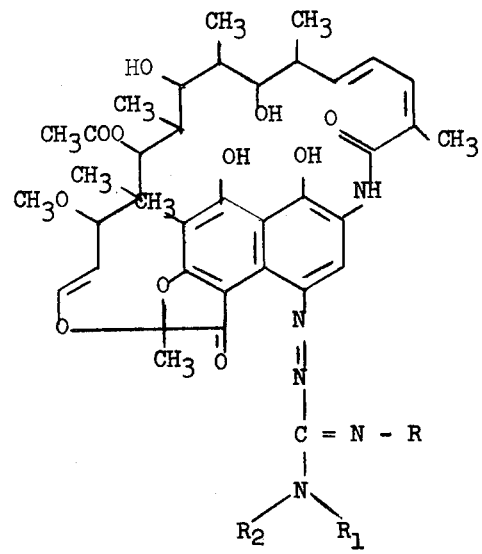

wherein $R$ is a substituted lower alkyl radical of the formula $-(CH_2)_n-A$ wherein $n$ is the number 2 or 3, $A$ stands for a hydroxyl group or for an

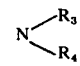

group where $R_3$ and $R_4$ individually may be hydrogen, lower alkyl, lower alkylamino-lower alkyl, di-lower alkylamino-lower alkyl or cycloalkyl and together with the nitrogen atom to which they are attached a heterocyclic ring; $R_1$ is hydrogen or taken with R it may represent a lower alkylene radical to complete with the nitrogen atoms to which they are attached a heterocyclic ring; $R_2$ is hydrogen or, when the nitrogen atom to which it is attached is a part of a heterocyclic ring a lower alkyl group. The compounds are prepared by condensing 4-guanylazo-4-deoxyrifamycin SV with a substituted aliphatic amine derivative corresponding to the formula $H_2N-(CH_2)_n-A$ wherein n and A have the significance previously given. The compounds have antimicrobial activity and are useful as antibiotics.

9 Claims, No Drawings

4-GUANYLAZO-4-DEOXYRIFAMYCIN SV DERIVATIVES

BRIEF SUMMARY OF THE INVENTION

This invention relates to new antimicrobial compounds. More particularly, the invention relates to new rifamycin derivatives corresponding to the formula

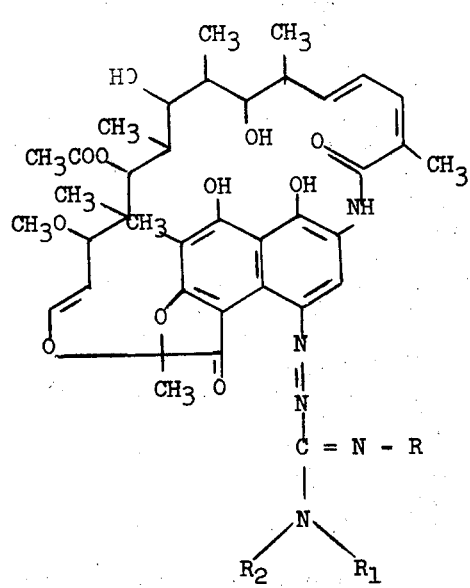

wherein R is a substituted lower alkyl radical of the formula —$(CH_2)_n$—A wherein $n$ is the number 2 or 3, A stands for a hydroxyl group or for an

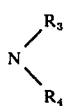

group where $R_3$ and $R_4$ individually may be hydrogen, lower alkyl, lower alkylamino-lower alkyl, di-lower alkylamino-lower alkyl or cycloalkyl and together with the nitrogen atom to which they are attached a heterocyclic ring; $R_1$ is hydrogen or taken with R it may represent a lower alkylene radical to complete with the nitrogen atoms to which they are attached a heterocyclic ring; $R_2$ is hydrogen or, when the nitrogen atom to which it is attached is a part of a heterocyclic ring a lower alkyl group. By lower alkyl and lower alkylene is meant 1 to 4 carbon alkyl groups and 2 to 4 carbon alkylene groups, such as, for example, methyl, ethyl, propyl and butyl, and ethylene, propylene and butylene, respectively.

In accordance with the present invention it has been found that 4-guanylazo-4-deoxyrifamycin SV can be condensed with a substituted aliphatic amine derivative of the formula $H_2N$—$(CH_2)_n$—A wherein $n$ and A have the same significance as above. 4-Guanylazo-4-deoxyrifamycin SV is the condensation product of rifamycin O with amino-guanidine (Greco et al. Farmaco Ed. Sci. XVI, 755, 1961) and may be considered as a tautomeric form of the 4-aminoguanylhydrazone of rifamycin S

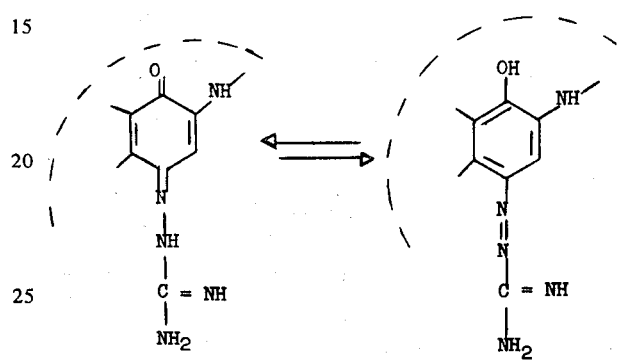

The new compounds which are obtained in accordance with the present invention practically derive from the substitution of one of the nitrogen atoms of the guanyl radical by the nitrogen atom of one of the mentioned amine compounds. In those cases, where the amine compound has a further aminic function

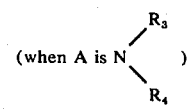

(when A is N$\diagdown$R_4 / R_3$)

capable of exchanging with the other nitrogen atom of the guanyl group, a heterocyclic compound may also form.

The recovery of the end products is effected by evaporating the organic layer after washing the solution with water or dilute acid. The crude products, which often are admixed with small amounts of starting material, may be purified by column chromatography and then crystallized from a suitable organic solvent, such as, for instance, acetone, ligroin, cyclohexane and ethyl acetate.

In accordance 4the methods described and exemplified herein, the following table represents 4-(substituted-azo)-4 -deoxyrifamycin SV derivatives which can be prepared. This table is not to be considered limitative of the scope of the present invention, which is defined in the claims.

TABLE

| Condensation Product of: | With: |
|---|---|
| 4-guanylazo-4-deoxyrifamycin SV | N-ethylethylenediamine |
| 4-guanylazo-4-deoxyrifamycin SV | N,N-diethylethylenediamine |
| 4-guanylazo-4-deoxyrifamycin SV | N-cyclohexyl-1,3-propanediamine |
| 4-guanylazo-4-deoxyrifamycin SV | 1,1-dimethyldiethylenetriamine |
| 4-guanylazo-4-deoxyrifamycin SV | ethylenediamine |
| 4-guanylazo-4-deoxyrifamycin SV | N-methylethylenediamine |
| 4-guanylazo-4-deoxyrifamycin SV | N-methyl-1,3-propanediamine |
| 4-guanylazo-4-deoxyrifamycin SV | N,N-dimethylethylenediamine |
| 4-guanylazo-4-deoxyrifamycin SV | 1,1-diethyldiethylenetriamine |
| 4-guanylazo-4-deoxyrifamycin SV | 1-(2-aminoethyl)-pyrrolidine |
| 4-guanylazo-4-deoxyrifamycin SV | ethanolamine |
| 4-guanylazo-4-deoxyrifamycin SV | N-(2-diethylaminoethyl)-1,3-propanediamine |
| 4-guanylazo-4-deoxyrifamycin SV | N,N-diethyl-1,3-propanediamine |

DETAILED DESCRIPTION OF THE INVENTION

The new compounds are obtained by contacting at a temperature between about 0° and 35° C. in an organic inert solvent 4-guanylazo-4-deoxyrifamycin SV with a suitable amine compound, as specified above, for a period of time varying from about 12 hours to several days. The proportions of reactants used are not critical, some of the desired product being formed no matter what proportions of starting materials are used. The reaction consumes the reactants in equimolar proportions. However, superior yields and more rapid reaction when a large excess of several times the molar proportion of amine compound is used. According to a preferred embodiment of the process of this invention, to substantially one part by weight of rifamycin derivative substantially one part by weight of the suitable amine compound is added at room temperature. Owing to the lower molecular weight of the amine with respect to the rifamycin derivative, the amine compound is present in a large excess. A still larger amount of amine compound may be used in some instances to expedite reaction. The solution is kept at room temperature for about 12 to 48 hours until the reaction is substantially complete, as determined by chromatographic analysis of a sample. If the reaction is not yet complete after 48 hours, the solution is allowed to stand for an additional 1 to 4 days, as necessary. In some cases, during this further period of reaction, the temperature is maintained at about 0° to 5° C. in order to avoid a partial decomposition of the end product, due to side reactions.

The compounds of this invention show a high degree of antimicrobial activity. Particularly remarkable is their activity against *Mycobacterium tuberculosis* $H_{37}R_v$. In fact, the compounds of this invention inhibit the growth of *Mycobacterium tuberculosis* $H_{37}R_v$ at concentrations ranging from 0.001 to 0.002 γ/ml. This very remarkable activity is coupled with a low toxicity since the compounds have an $LD_{50}$ in mice generally higher than 3000 mg./kg. per os. Another very favorable characteristic of the inventive compounds is that they are more soluble than 4-guanylazo-4-deoxyrifamycin SV (rifamycin AG) in water and other polar solvents. The last-named compound despite its good antimicrobial properties was found not to be suitable for therapeutic purposes, since it is practically insoluble in water and other pharmaceutically acceptable solvents. The new rifamycin derivatives of this invention, on the contrary, may be usefully employed for therapeutic usage. They may be readily compounded into pharmaceutical dosage forms such as tablets, capsules, elixirs, solutions for parenteral administration and the like.

The following non-limitative examples are given to describe and illustrate the manner and process of making the inventive compounds.

EXAMPLE 1

Condensation product of 4-guanylazo-4-deoxyrifamycin SV with ethylenediamine

To a solution of 1.0 g. of 4-guanylazo-4-deoxyrifamycin SV in 20 ml. of tetrahydrofuran 1.0 g. of ethylenediamine is added. The solution is allowed to stand at a temperature between about 20° and 30° C. At intervals, samples of the reaction mixture are examined by thin-layer chromatography (silica gel plate; eluent: acetone and chloroform in a 1:1 ratio) in order to determine when the reaction has reached a satisfactory conversion percentage. After 24 hours, the red-violet spot (Rf:0.6) of the end product is accompanied only by traces of the starting material (Rf:0.55) and of an unknown by-product (Rf-0.1). The mixture is then concentrated to a small volume and then poured into ethylacetate and the resulting solution washed three times with water. After drying over sodium sulfate, the organic layer is evaporated in vacuo. The residue is purified by column chromatography through silica gel using as eluent a mixture of chloroform and acetone in a ratio varying from 20:1 to 4:1. Fractions 1 through 30, each of them having a volume of about 50 ml., are collected and then evaporated to dryness. A solid melting at 158°–165° C. with decomposition is obtained in a 39% yield.

The analytical data support a 2-imidazoline ring formation in which the two nitrogen atoms of the guanyl radical are substituted by the ethylene diamine group.

| Elemental Analysis (percent by weight) | | |
|---|---|---|
| Calculated for $C_{40}H_{51}N_5O_{11}$: | | |
| C, 61.80; | H, 6.37; | N, 9.02 |
| Found: | | |
| C, 61.78; | H, 7.07; | N, 9.30 |

Characteristic U.V. and visible bands in solution in methanol:phosphate buffer 1:1 at pH 6.24.

| λmax | $E_{1\ cm}^{1\%}$ |
|---|---|
| ≃ 245 mμ | shoulder |
| 277 mμ | 318 |
| ≃ 315 mμ | shoulder |
| 355 mμ | 269 |
| 525 mμ | 313 |

EXAMPLE 2

Condensation product of 4-guanylazo-4-deoxyrifamycin SV with N-methylethylenediamine Following the procedure of the previous example, an amount of 0.8 g. of 4-guanylazo-4-deoxyrifamycin SV is reacted with 0.86 ml. of N-methylethylenediamine for 48 hours at a temperature between 20° and 35° C.

By concentrating the ethyl acetate solution, 0.300 g. of crude product are recovered which after two crystallizations from acetone melts at 181° C. with decomposition.

Yield: 0.022 g. (26%).

The analytical data support a 1-methyl-2-imidazoline ring formation.

Elemental Analysis (percent by weight)
Calculated for $C_{41}H_{53}N_5O_{11}$:
C, 62.18;   H, 6.73;   N, 8.84
Found:
C, 62.46;   H, 7.26;   N, 9.20

Characteristic U.V. and visible bands in solution in methanol:phosphate buffer 1:1 at pH 6.24.

| $\lambda$max | $E_{1\ cm}^{1\%}$ |
|---|---|
| 280 m$\mu$ | 330.7 |
| 358 m$\mu$ | 270.9 |
| 532 m$\mu$ | 351.6 |

EXAMPLE 3

Condensation product of 4-guanylazo-4-deoxyrifamycin SV with ethanolamine

An amount of 0.750 g. of 4-guanylazo-4-deoxyrifamycin SV is reacted with 1.8 ml. of ethanolamine in 13 ml. of tetrahydrofuran for 23 hours at room temperature. The crude product is recovered in the same manner as in Example 1 and then is purified by chromatography through a silica gel column (14 g.) by eluting with chloroform/acetone mixtures with an acetone content varying from 5 to 15%. The effluent is collected in several fractions of about 50 ml. each. The end compound is found in the 8th–47th fractions which are collected and concentrated to a small volume. Upon addition of ligroin, the pure compound precipitates in a crystalline form.

Yield 0.140 g. (18%). M.p. 175°–190° C.

Elemental Analysis (percent by weight)
Calculated for $C_{40}H_{53}N_5O_{12}$:
C, 60.36;   H, 6.72;   N, 8.80
Found:
C, 59.74;   H, 6.73;   N, 8.83

Characteristic U.V. and visible bands in solution in methanol:phosphate buffer at pH 6.24.

| $\lambda$max | $E_{1\ cm}^{1\%}$ |
|---|---|
| 535 m$\mu$ | 356.2 |
| 357 m$\mu$ | 251.3 |
| 282 m$\mu$ | 342.3 |

EXAMPLE 4

Condensation product of 4-guanylazo-4-deoxyrifamycin SV with N-methyl-1,3-propanediamine Following the procedure of Example 1, an amount of 1.6 g. of 4-guanylazo-4-deoxyrifamycin SV is reacted with 2.0 g. of N-methyl-1,3-propanediamine for 48 hours, at a temperature of 24° to 30° C. The end product is directly recovered from the ethyl acetate solution by crystallization after standing for 5–6 hours at room temperature. The compound is filtered and dried in vacuo.

Yield 0.9 g. (51%).

Elemental Analysis (percent by weight)
Calculated for $C_{42}H_{58}N_6O_{11}$:
C, 61.22;   H, 7.22;   N, 10.20
Found:
C, 61.30;   H, 7.05;   N, 10.20

Characteristic U.V. and visible bands in solution in methanol:phosphate buffer 1:1 at pH 6.24.

| $\lambda$max | $E_{1\ cm}^{1\%}$ |
|---|---|
| 284 m$\mu$ | 339.7 |
| 360 m$\mu$ | 247.0 |
| 545 m$\mu$ | 391.5 |

EXAMPLE 5

Condensation product of 4-guanylazo-4-deoxyrifamycin SV with 1,1-diethyldiethylenetriamine Following the procedure as in Example 3, 1.6; g. of 4-guanylazo-4-deoxyrifamycin SV is reacted with 1.6 g. of 1,1-diethyldiethylenetriamine for 5 days at room temperature. The compound is purified by column chromatography on 70 g. of silica gel by eluting with chloroform-ethanol mixtures containing, respectively, 5, 8, and 10% of ethanol. The 7th–14th fractions are collected and after concentration to a small volume the solution is poured into ligroin. After standing for some hours, 0.6 g. of practically pure compound are recovered.

M.p. 126°–134° C., Yield 31%.

Elemental Analysis (percent by weight)
Calculated for $C_{46}H_{67}N_7O_{11}$:
C, 61.79;   H, 7.55;   N, 10.97
Found:
C, 61.86;   H, 7.70;   N, 10.80

Characteristic U.V. and visible bands in solution in methanol:phosphate buffer 1:1 at pH 6.24.

| $\lambda$max | $E_{1\ cm}^{1\%}$ |
|---|---|
| 280 m$\mu$ | 300.9 |
| 357 m$\mu$ | 246.4 |
| 530 m$\mu$ | 297.8 |

EXAMPLE 6

Condensation product of 4-guanylazo-4-deoxyrifamycin SV with 1,1-dimethyldiethylenetriamine Following the procedure as in Example 5, 0.8 g. of 4-guanylazo-4-deoxyrifamycin SV is reacted with 1.3 g. of 1,1-dimethyldiethylenetriamine for 48 hours at a temperature between about 20° and 30° C. The crude compound is purified by chromatography through a silica gel column. The compound is found in the 13th–20th fractions, each of which has a volume of about 10 ml. By addition of ligroin to the pooled fractions, the end product is obtained in a 35% yield.

M.p. 143° C.

| Elemental Analysis (percent by weight) | | |
|---|---|---|
| Calculated for $C_{44}H_{63}N_7O_{11}$ | | |
| C, 61.02; | H, 7.33; | N, 11.32 |
| Found: | | |
| C, 61.80; | H, 7.45; | N, 11.49 |

Characteristic U.V. and visible bands in solution in methanol:phosphate buffer 1:1 at pH 6.24.

| λmax | $E_{1\,cm}^{1\%}$ |
|---|---|
| 280 mμ | 316 |
| 357 mμ | 259 |
| 535 mμ | 325 |

EXAMPLE 7

Condensation product of 4-guanylazo-4-deoxyrifamycin SV with N-cyclohexyl-1,3-propanediamine The compound is prepared according to the procedure of Example 4.

M.p. 157°–160° C. with decomposition.

| Elemental Analysis (percent by weight) | | |
|---|---|---|
| Calculated for $C_{47}H_{69}N_6O_{11}$: | | |
| C, 63.35; | H, 7.47; | N, 9.43 |
| Found: | | |
| C, 62.80; | H, 7.78; | N, 9.32 |

EXAMPLE 8

Condensation product of 4-guanylazo-4-deoxyrifamycin SV with 1-(2-aminoethyl)-pyrrolidine The compound is prepared according to the procedure of Example 4.

M.p. 150° C. with decomposition.

| Elemental Analysis (percent by weight) | | |
|---|---|---|
| Calculated for $C_{44}H_{60}N_6O_{11}$: | | |
| C, 62.25; | H, 7.12; | N, 9.90 |
| Found: | | |
| C, 61.31; | H, 7.06; | N, 9.04 |

What is claimed is:

1. A rifamycin SV derivative corresponding to the formula:

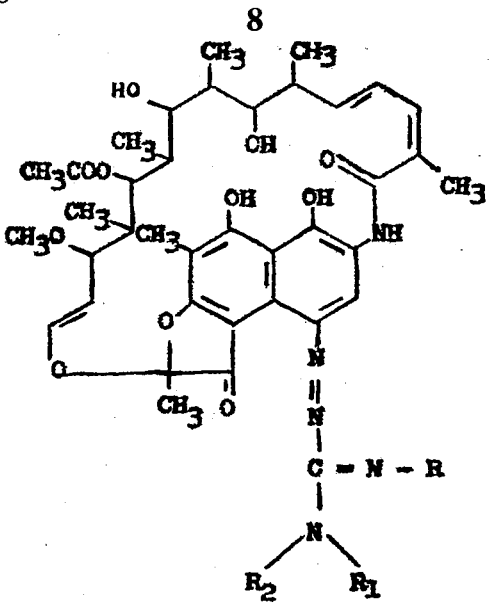

wherein R represents —$(CH_2)_n$—A wherein $n$ represents the integer 2 or 3, A represents hydroxy or

where $R_3$ and $R_4$ individually represent hydrogen, lower alkyl, lower alkylamino-lower alkyl, di-lower alkylamino-lower alkyl or cyclohexyl or together with the nitrogen atom to which they are attached represent pyrrolidyl; $R_1$ represents hydrogen or, taken with R, represents ethylene to complete with the nitrogen atoms to which they are attached imidazolyl; $R_2$ represents hydrogen or, when the nitrogen atom to which it is attached is a part of imidazolyl, lower alkyl.

2. The product of claim 1 which is 4-(1-imidazolin-2-yl)azo-4-deoxyrifamycin SV.

3. The product of claim 1 which is 4-(3-methyl-1-imidazolin-2-yl)-azo-4-deoxyrifamycin SV.

4. The product of claim 1 which is 4-[N-(2-hydroxyethyl)guanyl]azo-4-deoxyrifamycin SV.

5. The product of claim 1 which is 4-[N-3-(methylamino)propylguanyl]azo-4-deoxyrifamycin SV.

6. The product of claim 1 which is 4-[N-(N,N-diethylethylenediamino-ethyl)guanyl]azo-4-deoxyrifamycin SV.

7. The product of claim 1 which is 4-[N,N-dimethylethylenediamino-ethyl)guanyl]azo-4-deoxyrifamycin SV.

8. The product of claim 1 which is 4-[N-3(N-cyclohexylamino)propyl-guanyl]azo-4-deoxyrifamycin SV.

9. The product of claim 1 which is 4-[N-(2-pyrrolidino-ethyl)guanyl]azo-4-deoxyrifamycin SV.

* * * * *